Dec. 5, 1961    P. F. HAYNER    3,011,740
HYDRAULIC CONTROL APPARATUS FOR AIRCRAFT
FLIGHT CONTROL APPARATUS
Filed Oct. 25, 1954    3 Sheets-Sheet 1

INVENTOR.
PAUL F. HAYNER
BY
George H Fisher
ATTORNEY

INVENTOR.
PAUL F. HAYNER
BY George H Fisher
ATTORNEY

INVENTOR.
PAUL F. HAYNER
BY George H Fisher
ATTORNEY

United States Patent Office 3,011,740
Patented Dec. 5, 1961

3,011,740
HYDRAULIC CONTROL APPARATUS FOR AIRCRAFT FLIGHT CONTROL APPARATUS
Paul F. Hayner, Pelham, N.H., assignor, by mesne assignments, to Minneapolis-Honeywell Regulator Company, a corporation of Delaware
Filed Oct. 25, 1954, Ser. No. 464,221
4 Claims. (Cl. 244—83)

The present invention is concerned with hydraulic servo mechanism for flight control apparatus, in particular, the flight control apparatus of the invention disclosed in the copending application of Benjamin H. Ciscel, Serial No. 421,862, filed May 24, 1954.

In flight control apparatus in which craft control surfaces normally are controlled by automatic flight control apparatus such as an "automatic pilot," there is still a need for manual control of the craft control surfaces whenever the pilot desires such or upon failure of the automatic control. Hydraulic servo mechanisms for such control apparatus must allow the pilot to take over control of the craft by manual means when he so desires or whenever such is necessary for proper craft control, that is, upon failure of the hydraulic servo pressure source, upon failure of the automatic flight control apparatus, or upon the necessity of overriding the automatic control apparatus.

The hydraulic servo mechanism in particular comprises an improved cut-off means for rendering the hydraulic boost actuator ineffective whenever there is a failure in the hydraulic fluid source so that the pilot will have complete manual control; and an improved override mechanism so that the pilot can manually override the automatically controlled servo mechanism.

It is therefore an object of the present invention to provide an improved hydraulic servo mechanism for use in craft control apparatus;

Another object of the present invention is to provide in a hydraulic servo mechanism an improved cutoff valve so that upon the application of fluid under pressure to the valve rapid operation will occur.

A further object of the present invention is to provide, in a hydraulic servo mechanism, a novel ram centering device for placing the output shaft of the servo mechanism in a predetermined position on servo pressure failure;

Another object of the present invention is to provide, in a hydraulic servo mechanism, an override means associated with a hydraulic actuator so that upon the existence of a fluid pressure on one side of the actuator higher than the supply pressure, fluid will flow from one side to the other of the actuator, thereby reducing the existing pressure.

Figure 1:
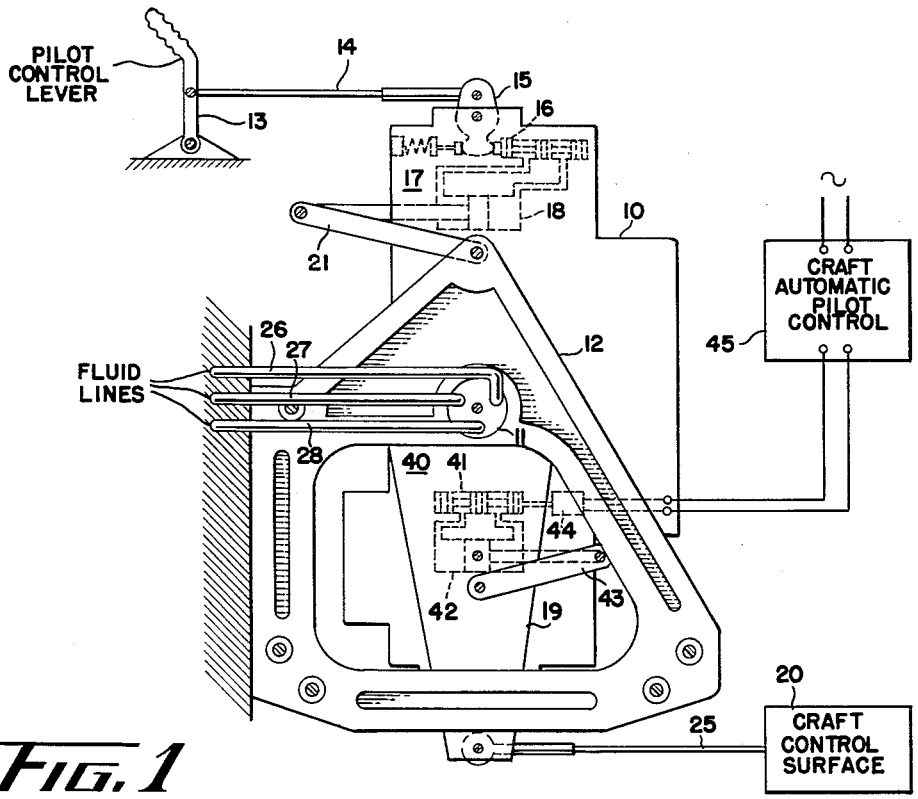
Figure 2:
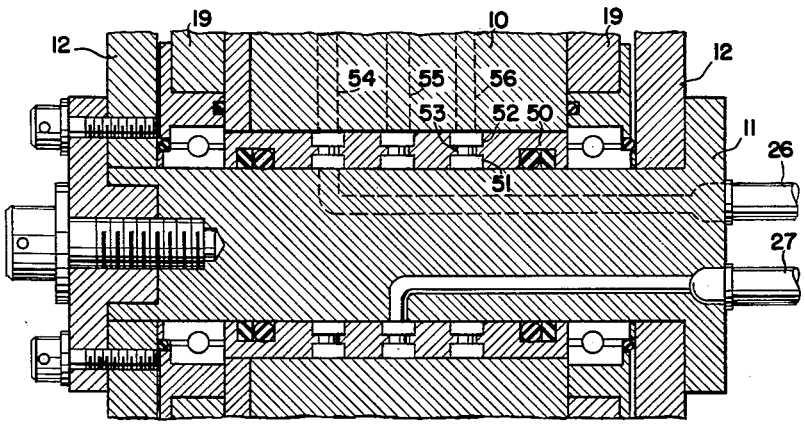
Figure 3:
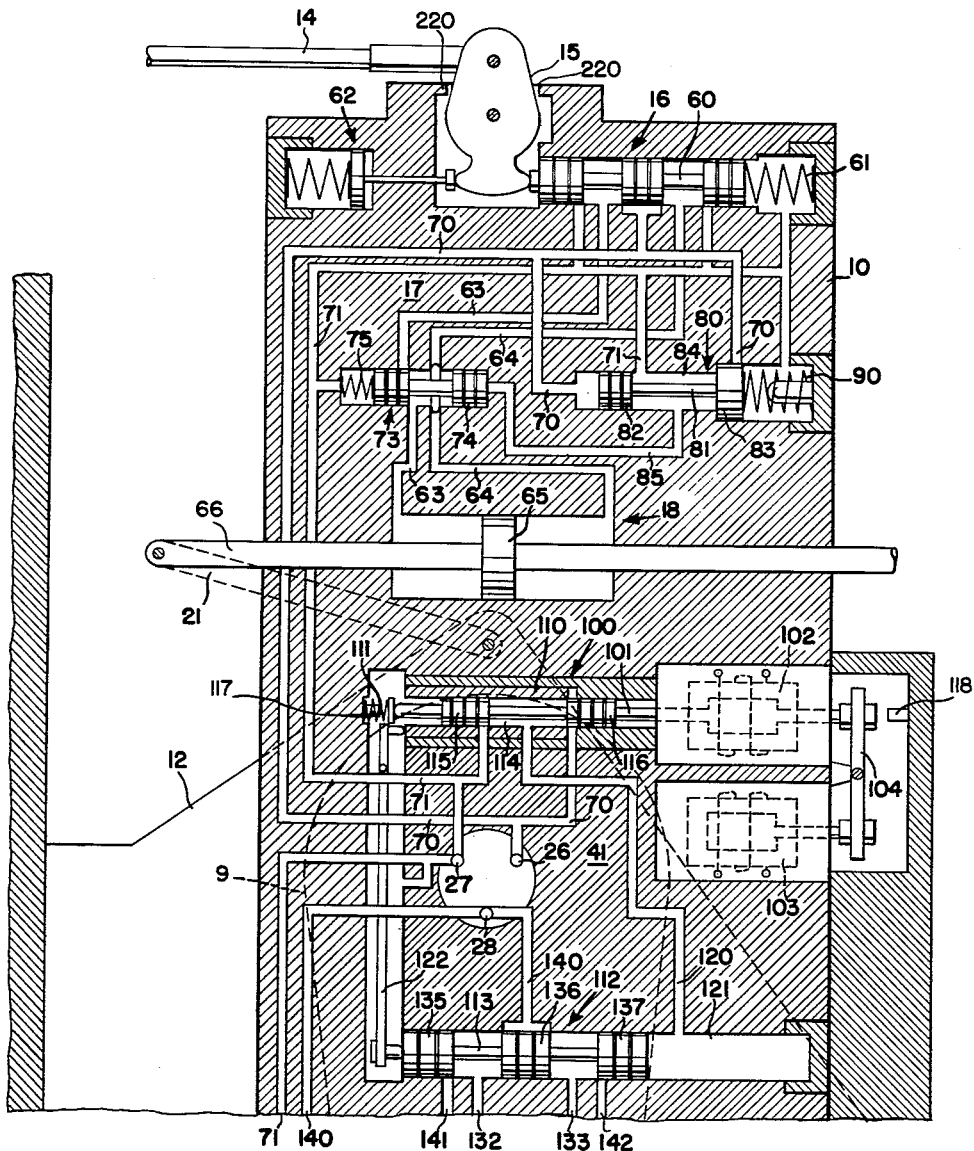
Figure 3A:
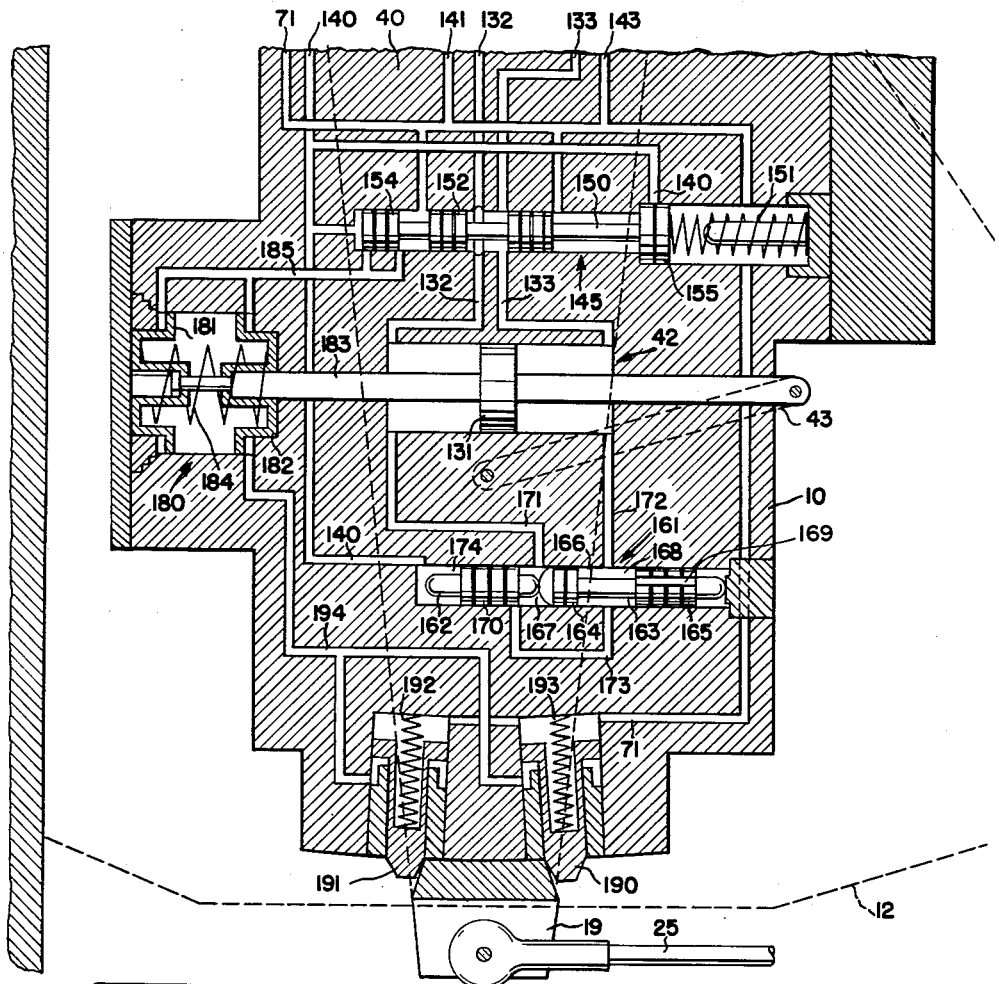
Figure 4:
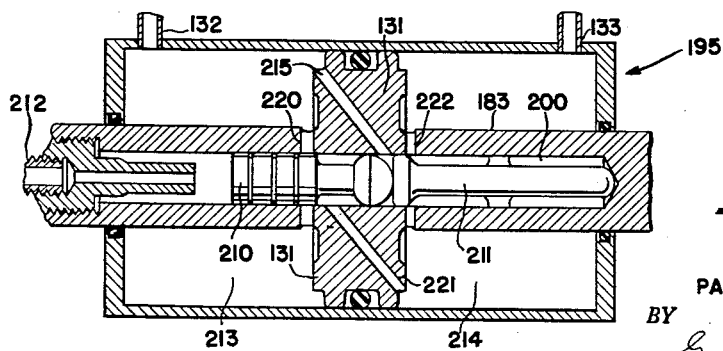

Other objects of the invention will be apparent from a consideration of the accompanying specification, claims, and drawings, of which:

FIGURE 1 is a schematic view of a flight control apparatus containing the improved hydraulic servo mechanism, FIGURE 2 is a sectional view of the pivotal connection between the main body and the base member of the flight control apparatus providing a continuous hydraulic connection between the base member and the main body, FIGURES 3 and 3a are schematic sectional views of the hydraulic servo mechanism, and FIGURE 4 is a sectional view of another embodiment of a hydraulic override that is shown in FIGURE 3a.

The flight control apparatus of the invention disclosed in the copending application mentioned above provides for the manual control of the aircraft control surface such as an elevator or rudder and superimposed on that control is the aircraft automatic pilot control which is normally provided by an electronic apparatus to maintain the craft on a course set by a selector. As it requires a considerable amount of effort to manually move the craft control apparatus, a hydraulic boost mechanism is provided to interconnect the manual control lever to the main body thereby reducing the amount of force normally required by the pilot to actuate the flight control apparatus.

In particular, referring to FIGURES 1 and 2, a main body 10 of a flight control apparatus is pivotally connected by a shaft 11 to a base member 12. A manual control lever 13 is connected by a link 14 and a crack 15 to the main body. The crank 15 also controls a control valve 16 of an improved hydraulic boost servo mechanism 17 having an actuator 18, the output of which is connected by linkage 21 to the base member. The boost mechanism will be explained in detail later in the specification. An output arm 19 is also pivotally connected by shaft 11 to base member 12 and is connected to a craft control surface 20, such as the rudder of an aircraft, by a link 25. Output arm 19 can be locked to the body 10 by a lock means (not shown in FIGURE 1) so that movement of the manual control lever can effectively operate the craft control surface even without the boost actuator mechanism in operation; however, with a hydraulic fluid under pressure supplied from a source (not shown) by conduits 26 and 28, 27 being an exhaust conduit, connected to the body through the shaft 11, the boost mechanism upon movement of crank 15 operates control valve 16 to cause actuator 17 to position the body with respect to the base member.

Another improved hydraulic servo mechanism 40 has a control valve 41 that is connected to an actuator 42 whose output is connected by a link 43 to output arm 19. When valve 41 is operated by a solenoid 44 in response to a craft automatic pilot control 45, output arm 19 (with the lock means inoperative) is able to move with respect to the body to further position the craft control surface in response to the automatic pilot control signal.

Referring to FIGURE 2, shaft 11 is shown rigidly connected to base member 12, body 10 is pivotally connected to the shaft, and crank 19 is pivotally connected to body 10. A sleeve or bearing 50 surrounding shaft 11 contains a plurality of sets of annular rings, two of which are, as examples, 51 and 52 located on the inner and outer surface of the sleeve, respectively. A series of holes 53 through the sleeve interconnects each set of rings. Conduits 26 and 27 (28 not shown) are each connected to a particular inner ring so that regardless of the position of the body with respect to shaft 11 continuous hydraulic communication is maintained from shaft 11 to body 10, the servo mechanism of the body being connected to conduits 54, 55 and 56, each of which connect to a respective outer ring.

In FIGURE 3 the boost servo mechanism 17 is shown with control valve 16 being operated by crank 15. The valve comprises a movable member 60 biased against the crank by a spring 61. A counterbalance 62 on the opposite side of crank 15 from the movable member provides for an equal pressure on the crank for centering. Valve 16 is connected to actuator 18 by passages 63 and 64, the actuator having a movable piston 65 connected by piston rod 66 and link 21 to base member 12. Fluid under high pressure is received by valve 16 from conduit 26 through a passage 70, and exhaust is provided by a passage 71 connected to conduit 27. Movement of crank 15 to position movable member 60 of valve 16 controls the supply of pressure to one side or the other of piston 65 to move body 10 with respect to base member 12 in response to the manual control signal received by crank 15. Thus it is seen that the pilot has manual control of the craft control surface by the control lever; however to reduce the force required by the pilot to operate such control the boost mechanism 17 provides the necessary power for operation of the body and output.

Interposed between control valve 16 and actuator 18 is a control valve 73 having a movable member 74 biased in one direction by a spring 75. Normally without the application of hydraulic fluid under pressure to control valve 73, member 74 blocks communication between the valve 16 and actuator 18 through conduit 63 and connects both sides of actuator 18 together rendering the pilot valve ineffective and providing for movement of body 10 without resistance from actuator 18 as fluid readily flows from the chamber on either side of piston 65 to the other through passages 63 and 64. When member 74 is displaced to the left, passage 63 is opened, communication between 63 and 64 is prevented and passage 64 remains open because of the annular groove in the bore for member 74. (See FIG. 3.)

A snap action valve 80 controls valve 73. Valve 80 has a movable member 81 having pistons 82 and 83 with different effective areas. A cavity 84 between the pistons is connected to control valve 73 by a passage 85 so that hydraulic fluid can be applied to the end of movable member 74 opposite spring 75. Normally, member 81 is biased to the left by a spring 90 so that piston 83 closes a connection to high pressure passage 70 and piston 82 uncovers a connection to exhaust passage 71. Upon the application of hydraulic fluid under pressure from passage 70 to the left end of the smaller piston member 82 opposite spring 90, the force on movable member 81 resulting from the pressure of the hydraulic fluid on piston 82 begins movement of member 81 to the right against the force of spring 90 to initially close off exhaust passage 71. Upon further movement of member 81, piston 83 opens high pressure passage 70 to permit the fluid to exert its force on the larger piston 83, thereby accelerating the movement of member 81 to the right as well as permitting high pressure fluid to enter cavity 84 and passage 85. Upon the existence of high pressure fluid in passage 85, movable member 74 of control valve 73 will move to the left against spring 75 to open passage 63 and disconnect the interconnection between the opposite sides of the actuator 18 thereby providing normal control of the actuator 18 by control valve 16. The valve 80 insures an immediate and positive snap-action operation of valve 73 when fluid under pressure is available, thus immediately placing the boost mechanism in operation.

The hydraulic servo mechanism of FIGURE 3 used to control output arm 19 in response to the craft automatic pilot control has a valve assembly 41 of a type disclosed in the application of Paul F. Hayner et al., Serial No. 404,684, filed January 18, 1954, comprising a first valve 100 having a movable member 101 positioned by the resultant effect of a pair of solenoids 102 and 103 interconnected by a pivotal link member 104. When electrical power is supplied to either one of the solenoids by a connection (not shown) from the craft automatic pilot control, member 101 moves either to the left or right by an amount depending on the energization of the solenoids. Member 101 is surrounded by a movable sleeve 110. Movable member 101 is biased to the right by a spring 111. A stop 117 limits the leftward movement of the movable member 101. Another stop 118 associated with link 104 limits the movement of member 101 to the right. Connected to the valve 100 is a control valve 112 having a movable member 113. A cavity 114 between pistons 115 and 116 of movable member 101 is connected by a passage 120 to a cavity 121 at one end of movable member 113. Normally, pistons 115 and 116 shut off the flow of fluid from cavity 114 to the exhaust passage 71 and from high pressure passage 70 to cavity 114, respectively. Movement of member 101 to the left exhausts the fluid in cavity 114 as well as 121 and movement of the member to the right supplies fluid at high pressure to cavity 121. Sleeve 110 and movable member 113 are connected by a pivoted lever 122 so that the position of member 113 establishes a corresponding position of sleeve 110 in response to the pressure in chamber 121 for follow-up purposes. While force through lever 122 is rightwardly applied to sleeve 110, a counteracting force is applied to the sleeve by high pressure fluid of passage 70 acting on the right-hand end area of the sleeve.

An actuator 42, referring to FIGURE 3a, comprising a piston 131 mechanically connected to crank 19 by piston rod 183 and link 43 is hydraulically connected to control valve 112 by a pair of passages 132 and 133 connected to the opposite sides of piston 131. Movable member 113 of control valve 112 comprises three pistons 135, 136 and 137, piston 136 normally closing off the passage of high pressure servo fluid from conduit 28 through a passage 140. Passages 132 and 133 are connected to the cavities between pistons 135 and 136, and 136 and 137, respectively, so that as movable member 113 is moved in either direction high pressure fluid is supplied from passage 140 to the respective cavity and thereby to either one side or the other of piston 131. Pistons 135 and 137 normally block exhaust passages 141 and 142 that are connected to conduit 27.

Interposed between control valve 112 and actuator 42 is a cutoff valve 145 the operation of which is similar to the combined operation of valves 73 and 80 in the boost hydraulic servo mechanism 17 explained above. Valve 145 comprises a movable member 150 normally biased to the left by a spring 151. Normally, when member 150 is biased to the left, communication between passages 132 and 133 exists so that piston 131 can be moved. Upon the existence of a supply of hydraulic fluid under pressure in conduit 28, fluid is applied to passage 140 and to one end of movable member 150 against piston 154 having a relatively small effective area so that movable member 150 is moved to the right against the spring at a relatively slow rate. Subsequently, another piston 155 having a larger effective area uncovers a connection to passage 140 to apply fluid under pressure to piston 155 thereby moving member 150 to the right at a greater rate. With movable member 150 to the right, the interconnection between conduits 132 and 133 is broken by the repositioning of piston 152. Thus, actuator 42 is connected to be controlled by control valve 112. Cutoff valve 145 insures a positive connection between the control valve and the actuator, this connection is quickly made when the supply of fluid under sufficiently high pressure is available.

Connected in parallel with actuator 42 is an over-ride valve 161. Valve 161 comprises movable members 162 and 163 arranged adjacent to each other for axial movement within a bore 166 in body 10. Movable member 163 comprises two pistons 164 and 165 and member 162 has a single piston 170. One side of actuator 42 is connected to a cavity 167 between said movable members 162 and 163 by a passage 171 and the other side of actuator 42 is connected to a cavity 168 between pistons 164 and 165 by a passage 172. A passage 173 normally blocked by piston 170 is connected to cavity 168. High pressure fluid is admitted to cavity 174 at the left-hand extremity of bore 166 near the outer extremity of movable member 162 from passage 140 and this pressure normally maintains movable members 162 and 163 to the right against a stop. When the pressure on one side of actuator 42 exceeds the pressure of the source, the actuator pressure is applied to over-ride valve 161 by either passage 171 or 172. When the high pressure exists in passage 171, movable member 162 is moved to the left and piston 170 opens passage 173 to allow fluid to flow from passage 171 to passage 172 until the pressure in passage 171 is below the supply pressure. Should the pressure in passage 172 exceed the supply pressure of passage 140, movable member 163 will move to the left, pushing member 162 to also uncover passage 173 and allow fluid to flow from 172 to 171, this operation of 163 being possible due to a passage 169 in piston 165 as a pressure is applied to the right end of piston 165. It is therefore seen that a manual control of body 10 can override any superimposed automatic signal to position the craft control surface independent of automatic signals.

A centering mechanism 180 is provided to center the piston 131 when high pressure fluid is not available. The centering mechanism comprises a pair of dished members 181 and 182 mounted on a shaft 183 connected to piston 131 and held apart against raised portions on the shaft by spring 184. Normally, a chamber on the outer side of each dish member is connected by passage 185 and the cavity between pistons 152 and 154 of valve 145 to exhaust passage 71; however, upon the application of hydraulic fluid under pressure to valve 142, piston 154 blocks the exhaust passage and connects passage 185 to the high pressure supply. When high pressure fluid is applied to the outer sides of each of the dished members, they are moved toward one another against spring 184 to permit movement of shaft 183. Upon the failure of the source of hydraulic fluid, members 181 and 182 will move outwardly returning piston 131 to the center of actuator 42 which in turn repositions output arm 19 in a center position with respect to body 10.

Normally, without a supply of hydraulic fluid under pressure, output arm 19 is locked in place with respect to body 10 by a pair of members 190 and 191 wedged between output arm 19 and the body by a pair of springs 192 and 193. Upon the application of high pressure servo fluid to the centering device through passage 185, fluid is also supplied to the locking device to a passage 194 and is directed to cavities on the underside of members 190 and 191 to move them upward against the springs 192 and 193 rendering the locking device ineffective.

Referring to FIGURE 4, another embodiment of the override valve is shown. An actuator 195 having piston 131 is normally connected to the control valve (not shown) by passages 132 and 133. The override valve is contained in a hollow cavity 200 inside the rod 183. In the cavity, movable members 210 and 211 are adjacently located in axial relation and held to the right by the pressure of the source of hydraulic fluid connected at the connection 212. When the pressure in cavity 213, on one side of piston 131, exceeds the supply pressure, this high pressure from cavity 213 is applied through a passage 215 to movable member 210 to move it to the left. Movement of member 210 to the left uncovers a passage 220 to allow fluid to flow from cavity 213 through a passage 220 and 221 to the other side of piston 131, that being cavity 214. When the opposite is experienced and the pressure in 214 exceeds the pressure of the source this high pressure is applied to movable member 211 through a passage 222 to move both movable members against the supply pressure to also open passage 220 and allow hydraulic fluid to flow from the cavity 214 to the cavity 213. With such an actuator connected to the automatic flight control it is also possible for the pilot by manual control, either with boost servo action or without, to override the automatic operation whenever such is deemed necessary.

*Operation*

As shown in FIGURES 3 and 3a the control apparatus is assumed for the moment to be only manually operative as there is no hydraulic pressure available from the source (not shown) connected to conduits 26 and 28. In this condition, the boost mechanism actuator 18 is ineffective and piston 65 is free to move back and forth placing relatively little resistance between the body 10 and base member 12. Hydraulic servo actuator 42 is centered by the centering mechanism 180 and output arm 19 is locked in the center position so that the pilot can manually control the craft control surface by the control lever through the connection comprising link 14, body 10, and link 25. Movement of crank 15 with respect to body 10 is limited by stops 220 so that with the boost system inoperative a substantial connection exists between link 14 and body 10. While this sort of control would be successful, it would normally be only used during emergency as there would be a considerable effort needed to manually control such a craft control surface not only due to the wind resistance upon changing the position of a rudder or elevator but also due to the frictional resistance in the connection between the control lever and such elevators or rudders.

With fluid under pressure available through conduits 26 and 28, conduit 27 being connected to the exhaust of the fluid source, immediately movable member 81 of valve 80 would move to the right to insure a positive connection between passage 85 and passage 70, admitting high pressure fluid to the right extremity of movable member of control valve 73. The instantaneous operation of control valve 73 would positively place the boost servo mechanism in operation so that upon movement of manual control lever 13 and a subsequent operation of control valve 16, piston 65 of actuator 18 would provide the driving power necessary not only to move body 10 with respect to the base member but also to maintain the craft control surface in the position selected by the manual control lever 13. When link 14 moves to the right, hydraulic fluid under pressure is admitted to the right side of piston 65. Body 10 then moves to the right clockwise about pivot 11 (see FIGURE 1). The opposite occurs when link 14 is pulled to the left. With the boost servo mechanism in operation a relatively small amount of force is needed by the pilot to control the craft control surface.

The availability of high pressure fluid from conduit 28 places hydraulic servo mechanism 40 used to automatically control the position of output arm 19 into operation. Movement of member 150 of cutoff valve 145 to the right upon the application of high pressure fluid at its left extremity not only renders the operation of actuator 42 effective in response to the operation of control valve 41 but also deenergizes the lock means holding output arm 19 rigidly in position and renders centering mechanism 180 inoperative. The hydraulic servo mechanism is thus able to control the position of output arm 19 with respect to the body as determined by the electrical signal received from the craft automatic pilot control which operates the control valve solenoids 102 and 103.

Upon the instantaneous operation of the cutoff valve 145, the control valve 41 is connected in a controlling relation to the actuator 42. Movement of the movable member 101 in response to the output signal of the automatic pilot control 45 results in movement of the control valve 112. If member 101 is moved to the right, high pressure fluid enters the space 121 through the passage 70 to cause member 113 to move to the left thereby admitting high pressure fluid to one side of the piston 131 through passages 140 and 133, the other side of the piston being exhausted through passages 132 and 141. This causes movement of output arm 19 with respect to body 10 as body 10 is held under the power of servo 17, its actuator 18 being coupled to base 12. At the same time, sleeve 110 is moved to the right against the pressure of the fluid from passage 70 by the force exerted through link 122 from the movable member 113, this acting as a feedback and stabilization means for the valve. Under normal operation, the control valve positions the actuator 42 to move the output arm 19 in response to the signal received by the solenoids from the craft automatic pilot control 45.

Assuming that a maximum signal was received from automatic pilot control 45 to move output arm 19 counterclockwise to the right with respect to body 10 as far as actuator 42 would allow. The pilot, desiring to move control lever 13 to the left, would not be aware of the fact that a maximum amount of operation of the craft control surface in that direction has already been accomplished by the automatic control. Such often results in a straining of the linkages and even damage to the manual control mechanism for the pilot may believe he still has more control over the craft control surface, as he has not changed the position of control lever to its leftward extremity. To prevent such overstressing, override valve 161 is provided.

Whenever a manual movement of body 10 is desired and the craft control surface is at either of its extremities as a result of a signal from the craft automatic pilot control, valve 161 allows repositioning of piston 131 to relocate the body 10 allowing output arm 19 to remain stationary. With output arm 19 to the right as previously assumed, piston 131 is to the right and any movement of body 10 counterclockwise by the manual control lever 13 would tend to move piston 131 to the other end of actuator 42. As the fluid on the cavity on the left side of piston 131 is compressed to a pressure greater than that of the source available in passage 140, a pressure differential exists across piston 170 of movable member 162 causing the member to move to the left thereby opening passage 173 so that fluid can flow between passages 171 and 172 allowing piston 131 to move to the left. Due to the override valve 161, the manual control lever 13 could be moved to the left against a stop (not shown) without disturbing the relation between the automatic pilot control and the craft control surface. Similarly operation in the opposite direction would place a pressure differential across piston 70 and 164 to move both member 162 and 163 to the left again providing flow of fluid from opposite sides of actuator 42 through passage 173.

The operation of the other embodiment of the override valve as shown in FIGURE 4 is similar. The override valve is contained in an inner cavity in the shaft and piston assembly of the actuator, it having its particular advantages depending upon the actuator size requirements and other design features of the control.

While I have shown a specific form of hydraulic servo mechanism for control apparatus, it is to be understood that this is for illustrative purposes only and that the invention is to be limted solely by the scope of the appended claims.

I claim as my invention:
1. In control apparatus, a body pivotally supported on a base member, said body having input means and output means; automatic control means connected between said body and said output means; and centering means comprising a pair of members normally biased by a spring force in a manner to hold said output means in a predetermined position with respect to said body, said bias being normally effective to cause one of said members to prevent motion of said output means in one direction relative to said body and to cause the other member to prevent such motion in the opposite direction for forces on said output member less than said spring force, and pressure operated means connected to said members for rendering said centering means ineffective.

2. In control apparatus, a main body, an output arm movable with respect to said body, servo means having an output shaft for operatively connecting said arm to said body, and centering means associated with said output shaft and said body, said centering means comprising resilient means operating axially on said shaft for normally holding said arm in a predetermined position with respect to said body by preventing axial movement of said shaft for axial forces thereon less than the force exerted by said resilient centering means, and pressure operated means for rendering said resilient means ineffective.

3. In apparatus for controlling the position of an output shaft relative to the body of a mechanism, said shaft having a shoulder, a member having a hole therein for receiving the shaft and being movable therealong between a first and second position on the shaft, stop means on said body engageable by said member, resilient means for biasing the member in said first position to engage the shoulder on the shaft and to engage said stop means thereby preventing shaft movement in one direction for axial forces along said shaft of less magnitude than the force of said resilient means, and means for moving said member away from said first position against said shoulder and stop means to said second position so that said shaft is free to move between said first and second positions.

4. The apparatus of claim 3, and additionally comprising a second shoulder on said shaft, a second member intermediate said shoulders having a hole therein for receiving said shaft and being moveable therealong between a first and second position and being biased to said first position by said resilient means wherein it engages the second shoulder on said shaft, and means for moving the second member away from the first position to its second position.

References Cited in the file of this patent

UNITED STATES PATENTS

| | | |
|---|---|---|
| 1,711,967 | Robson | May 7, 1929 |
| 1,820,269 | Craig | Aug. 25, 1931 |
| 2,155,421 | Kenyon | Apr. 25, 1939 |
| 2,179,179 | Fischel | Nov. 7, 1939 |
| 2,426,986 | Dawson | Sept. 9, 1947 |
| 2,452,599 | Paulus | Nov. 2, 1948 |
| 2,459,496 | Cahill et al. | Jan. 18, 1949 |
| 2,478,173 | Austin | Aug. 9, 1949 |
| 2,590,716 | Lisle | Mar. 25, 1952 |
| 2,597,361 | Mott | May 20, 1952 |
| 2,670,715 | Conway | Mar. 2, 1954 |
| 2,780,427 | Keller et al. | Feb. 5, 1957 |